Patented Aug. 20, 1946

2,405,971

UNITED STATES PATENT OFFICE 2,405,971

HALOGENATED POLYETHYLENE

Ambrose McAlevy, Kennett Square, Pa., assignor to E. I. du Pont de Nemours & Company, Wilmington, Del., a corporation of Delaware No Drawing. Application March 23, 1943,
Serial No. 480,217

1 Claim. (Cl. 260—94)

This invention relates to an improved process for the halogenation of polymers from organic compounds containing monoolefinic unsaturation, and is more particularly related to an improved process for the chlorination of polymers from ethylene.

An object of the present invention is to provide an improved process for the halogenation of polymers derived from organic compounds having monoolefinic unsaturation and which contain at least one replaceable hydrogen per structural unit and molecular weights in excess of 300. Another object is to provide a process for the chlorination of monoolefin polymers which have molecular weights in excess of 300. Still another object is to provide an improved process for chlorinating polymers from ethylene which have molecular weights in excess of 300. Other objects and advantages of the invention will hereinafter appear.

The polymers from ethylene which are halogenated in accord with this invention include the solid to semi-solid high molecular weight substances of a polymeric nature which are obtained (1) by the polymerization of ethylene alone as described in U. S. Patents 2,153,553 and 2,188,465, (2) by the polymerization of ethylene with other polymerizable organic compounds as described in U. S. 2,200,429, (3) by contacting ethylene alone or in admixture with another polymerizable organic compound with molecular oxygen, a per-oxy compound, a hydrazine or hydrazinium compound or an amine oxide and a normally liquid, substantially inert reaction medium at a temperature in the range of 40° to 400° C. and at a pressure in excess of atmospheric preferably in the range of 50 to 3000 atmospheres, or (4) by reacting ethylene with a telogen to give telomers as described in the copending application of Hanford & Joyce, S. N. 438,466, filed April 10, 1942, and in the copending application of Hanford & Roland, S. N. 471,028, filed January 1, 1943.

The polymers of ethylene alone are either semi-solid or solid at normal temperatures, correspond in composition substantially to $(CH_2)_x$, and have molecular weights in excess of 1000. The properties of the polymers of ethylene with other polymerizable organic compounds vary depending upon the nature of the polymerizable organic compound and the composition of the polymer. The properties of the telomers depend inter alia upon such factors as the nature of the telogen and its reactivity, relative concentrations of telogen and ethylene, temperature employed in the telomerization, and nature of the catalyst.

The expression "polymers from ethylene" is used in the description and claims to refer to the polymers from ethylene alone and also to the modified ethylene polymers, interpolymers and telomers of the above kind.

In accord with this invention the polymers are dissolved or suspended in an organic solvent, preferably one which is substantially inert and then treated with an oxychloride of carbon or sulfur, in the presence of light, with or without the aid of a catalyst, e. g., a heterocyclic compound containing annular nitrogen. Alternatively, the reaction may be catalyzed by the use, in lieu of light, of a peroxide catalyst such, for example, as benzoyl peroxide. The amount of catalyst either used with light or employed in the alternate reaction can vary from 0.01 to 10% on the weight of the oxychloride, generally the amount which has been found to give satisfactorily good results is from about 0.10 to 2%.

In carrying out the invention by one practical method, a solution or suspension of the desired polymer and, if desired, a catalytic amount of a heterocyclic compound containing annular nitrogen, e. g., pyridine, is charged into a flask fitted with a reflux condenser, a stirrer with a suitable seal to prevent escape of solvent, a thermometer, and an oxychloride inlet. The reaction mixture is then heated, preferably to between 50 and 130° C., with agitation, exposed to a source of actinic light, and the oxychloride added portion-wise. After completion of the reaction the chlorinated polymer is isolated by means well known to the art.

The oxychlorides of carbon or sulfur that may be used include phosgene, $(COCl_2)$; oxalyl chloride, $(COCl)_2$; sulfuryl chloride, $(SO_2Cl_2)$; and, thionyl chloride, $SOCl_2$. In general, at least half a mole of the oxychloride is used for each hydrogen to be replaced in the polymer. As a rule, however, it is advantageous to increase the amount of the oxychloride to one mole.

As a source of actinic light there can be used a high wattage tungsten filament light, a mercury vapor light, sunlight, carbon arc, ultraviolet lamp, infrared lamp, or monochromatic light.

The apparatus may be of glass, enameled vessels, or corrosion resistant alloys.

If desired the process may be carried out as a continuous operation, for example, by injecting the oxychloride into a hot solution of the polymer flowing through an illuminated tube.

Suitable solvents include carbon tetrachloride, tetrachloroethylene, tetrachloroethane, hexachloroethane, and the like. In place of these chlorinated aliphatic hydrocarbons there can be used benzene, nitrobenzene, etc. If a low boiling solvent is used it is desirable to conduct the chlorination under pressure for this raises the boiling point of the solvent and maintains the product in solution.

The peroxide catalyst that may be used in accord with the alternate procedure includes hydrogen peroxide, persuccinic acid, lauroyl peroxide, tetralin peroxide, urea peroxide, butyryl peroxide, acetyl peroxide, diethyl peroxide, the alkali metal and alkaline earth metal peroxides, or mixtures thereof.

Generally the products obtained from the polymers of ethylene alone are rubbery, flexible, and tough with higher tensile strengths than the original polymers. At 20 to 25% chlorine content the materials are tacky. The tensile strength of the products increases very rapidly with increase in chlorine content. Above 30% chlorine, the softening points reach the range of those of the original polymers. The chlorinated polymers from ethylene are in most cases soluble in aromatic hydrocarbons, in chlorinated aliphatic hydrocarbons and in organic esters at ordinary temperatures.

Variation in the chlorine and the sulfur content of the halogenated polymer is possible. It has been found that if sulfur dioxide is introduced throughout the reaction sulfur content of the resulting chlorinated polymer can be increased up to from 5 to 10%. It is likewise possible to augment the chlorine content of the chlorinated polymer by introducing chlorine throughout the reaction. Furthermore, both gases may be introduced if an increase in the sulfur and chlorine content over that obtained by a given concentration of the oxychloride is desired. Variation in the sulfur content of the product is also obtained by the use of suitable reaction temperatures. In general, the sulfur content of the product varies inversely, with reaction temperature over the range 10° to 80° C. It is often convenient to lower the reaction temperature when the reaction is only partly complete, for in the intermediate ranges of chlorine content (10 to 35%) the resin is sufficiently soluble, in carbon tetrachloride, to permit lowering the temperature without precipitation occurring.

When phosgene is employed as the oxychloride the reaction is partly one of chlorination, but in runs of 24 hours' duration introduction of small amounts of carbonyl groups into the resin occurs, and an infusible, insoluble product results.

When the product of reaction between an oxychloride and an olefine polymer is soluble in the reaction mixture, the following procedure may be used for isolating it. The solvent, excess oxychloride and hydrogen chloride present after the reaction may be removed by simple steam distillation and the product, subsequently washed and dried on a mill, such as is used in compounding rubber, or contrariwise the product dissolved in benzene, carbon tetrachloride, dichloro difluoroethane, methylene chloride or other suitable solvent is precipitated therefrom by an aliphatic alcohol or other liquid miscible with the reaction medium employed but which is a non-solvent for the chlorinated polythene produced.

The following examples illustrate preferred embodiments of the invention in which parts are by weight.

*Example 1.*—Twenty-five parts of a polymer of ethylene, having a melt viscosity of 0.1, is dissolved with heating in 500 parts of carbon tetrachloride. Into the resulting mixture 15 parts of sulfuryl chloride and 40.5 parts of chlorine are added and the mixture heated under reflux, in the light of a 300-watt tungsten filament, electric lamp, at approximately 77° C. for 60 minutes. The reaction mixture is drawn off, drowned in 1500 parts of methanol to precipitate the chlorinated polymer and after decantation and filtration the methanol is removed by treatment with steam. The product analyzes 47% chlorine and 0.56% sulfur.

The melt viscosity herein described is determined by the following procedure. An aluminum cylinder of ⅜" internal diameter open at the top is fitted at the bottom with an 8 mm. steel disk containing at its center a 2.1 mm. orifice. The cylinder and disk are heated to a temperature of 190° C. and the product to be tested introduced and heated to the same temperature. Above the surface of the product a piston heated to 190° C. and 11/32" in diameter is superimposed and upon it a weight is placed giving a combined weight of 2.16 kilograms. The weight of product flowing from the orifice in grams per minute is the measure of the melt viscosity.

*Example 2.*—25 parts of solid ethylene polymer having a melt viscosity of 0.1, is added to 500 parts of carbon tetrachloride and the resulting mixture heated and stirred to effect solution. 57 parts of sulfuryl chloride and 0.2 part of benzoyl peroxide are added and the resulting mixture heated under reflux at a temperature of approximately 77° C. for 90 minutes. The carbon tetrachloride, sulfuryl chloride, and hydrochloric acid are steam distilled from the reaction mixture, the reaction product is separated, dried on a rubber mill and is analyzed. It contains 30.9% of chlorine with substantially no sulfur.

*Example 3.*—Fifty parts of a polymer of ethylene, having a melt viscosity of 0.1, is dissolved in 1000 parts of carbon tetrachloride and to the solution there is added 120 grams of sulfuryl chloride. The resulting mixture is heated under reflux and irradiated during the reaction with a type H-4 100-watt mercury vapor lamp. After 140 minutes the product is steam distilled, and milled. It contains 34.4% of chlorine.

*Example 4.*—Eight parts of an ethylene polymer (average molecular weight 25,000–30,000) is dissolved in 480 parts of boiling carbon tetrachloride, and one-half part of pyridine is added to the solution. As the refluxing solution is stirred and is illuminated, 99 parts of sulfuryl chloride is added drop-wise over a period of 70 minutes. The mixture is stirred for 2 additional hours. The product precipitates out as a soft taffy-like coagulate. The carbon tetrachloride is decanted off, and occluded solvent, sulfuryl chloride, and hydrogen chloride are removed from the product by hot-water wash on a rubber mill. The dried product is flexible and tough and is soluble at ordinary temperatures in hydrocarbons and organic esters. It softens at 115° C. to 118° C. and contains 44.1% of chlorine and 2.6% of sulfur.

*Example 5.*—Ten parts of the ethylene polymer described in Example 3 is dissolved in 486 parts of hot tetrachloroethylene, and one-half part of pyridine is added. As the solution is stirred and is maintained at 100° to 110° C., it is exposed to actinic light, and 117 parts of sulfuryl chloride is added slowly over a period of 90 minutes. Stirring is continued for 45 additional minutes. No precipitate separates out, and the solution is steam distilled to remove solvent, sulfuryl chloride, and hydrogen chloride. The chlorinated polymer is washed and dried on a mill. It is tough, flexible, and soluble at ordinary temperatures in hydrocarbons and organic esters. It softens at 115° to 117° C. and contains 53.4% of chlorine and 0.7% of sulfur. A solvent-cast film 3 mils thick has a tensile strength of 4,600 pounds per square inch and an elongation of 276% at break. The original ethylene polymer is insoluble in cold solvents, and a solvent-cast film 4 mils thick has a tensile strength of 1,580 pounds per square inch and an elongation of 8% of break.

*Example 6.*—Ten parts of the ethylene polymer of Example 3 is dissolved in 405 parts of hot tetrachloroethylene and one-half part of pyridine is added. During the reaction the solution is illuminated with actinic light and is stirred vigorously at 100° to 105° C. Fifty parts of sulfuryl chloride is added over a period of 80 minutes. The solution is steam-distilled to remove the solvent and impurities. The product is washed and dried on a rubber mill. It is a soft rubbery material, containing 21% chlorine and only a trace of sulfur, and soluble in hydrocarbons at room temperature and in warm butyl acetate.

*Example 7.*—Twenty parts of the ethylene polymer of Example 1 is dissolved in 960 parts of boiling carbon tetrachloride, and 1 part of pyridine is added. The refluxing solution is illuminated with actinic light, and 109 parts of sulfuryl chloride is added slowly over a period of 90 minutes. Stirring is continued for 30 minutes. The coagulated precipitate is placed in boiling water to remove solvent and impurities. After drying in the air overnight the product is dissolved in methylene chloride and the solution shaken vigorously with powdered sodium bicarbonate to remove last traces of hydrogen chloride. The sodium bicarbonate is removed by centrifugation and decantation. Clear, colorless, transparent films may be cast from the resulting solution. A film 1.7 mils thick has a tensile strength of 3549 pounds per square inch and an elongation of 308% at break. The product contains 41.4% chlorine and 3% of sulfur.

*Example 8.*—To 5 parts of a liquid propylene polymer having a molecular weight of 318 is added approximately 0.7 part of pyridine, the mixture is stirred and irradiated with a 500 watt Mazda lamp while adding 5 parts of sulfuryl chloride during a period of 15 minutes. The irradiation is continued for an additional 45 minutes and the reaction mixture is then poured into 500 parts of a 30% aqueous sodium hydroxide solution. The product is extracted with ether and dried over magnesium sulfate. The solvent is removed at reduced pressure, and the product is obtained as a yellow liquid. Upon analysis it is found to contain 18.4% chlorine and no sulfur.

*Example 9.*—To a solution of 30 grams chloropolythene (having a chlorine content of 30.3%) in 500 cc. CCl₄, 30 grams oxalyl chloride is added, and the mixture irradiated for three days at 77° by means of a mercury vapor lamp. The product, which is isolated by steam distillation of the solvent, contained 34.3% Cl, 56.77% C, and 8.86% H. This analysis shows that the predominating reaction which occurred was chlorination.

*Example 10.*—A solution of 15 grams of solid ethylene polymer and 3 grams benzoyl peroxide in 300 cc. benzene is kept saturated with phosgene at a temperature close to the boiling point of the solvent. This mixture is irradiated with a 300 watt tungsten filament lamp for 24 hours. The resulting resin is somewhat similar to the ethylene polymer in appearance, but is infusible and insoluble.

In place of the polymer set forth in the above examples there can be used any polymer derived from an organic compound containing monoolefinic unsaturation and which contains at least one replaceable hydrogen per structural unit, said polymer being further characterized by having a molecular weight of at least 300. Specific examples of polymers which can be used in the practice of this invention include vinyl acetate, polyvinyl chloride, polystyrene, polymethylacrylate, polymethyl methacrylate, etc., the polymers of vinyl chloride with either vinyl acetate, fumaric esters, maleic esters, or vinylidene chloride; the polymers of ethylene with amylene, styrene, stilbene, vinyl acetate, methacrylic esters, ethyl itaconate, diethyl citraconate, diethyl maleate, diethyl fumarate, acrylic esters, vinyl chloride, vinyl fluoride, chlorotrifluoroethylene, vinylidene fluoride, vinylidene chloride, tetrafluoroethylene, maleic anhydride, vinyl butyl ether, etc.; polymers of vinylidene chloride with acrylonitrile, methacrylic esters, tetrafluoroethylene, vinyl chloride, etc., and methyl methacrylate, styrene, or vinylidene chloride.

The products may be removed from the reaction mixture and purified by means already described or the reaction mixture may be injected at the bottom of a vessel containing boiling water, whereupon the solvent and impurities will flash off or dissolve and the purified polymer may be skimmed off the top of the water. If the product is still in solution it may be precipitated from solution with alcohol or any liquid miscible with the solvent but not itself a solvent for the polymer. The polymer may then be redissolved in a suitable solvent and similarly reprecipitated any desired number of times. Drying may be carried out in the air or in a vacuum oven at a slightly elevated temperature.

The chlorinated products are applicable for use in wrapping films, in coating and waterproofing fabrics, as protective liners for acid or base containers, in lacquers for wood, cement, or metal, as gaskets and washers, etc.

I claim:

A process of chlorinating a polymer from ethylene having a molecular weight of at least 300 obtained by polymerizing ethylene at a temperature between 40 and 400° C. under pressures between 350 and 3000 atmospheres and in the presence of a catalyst selected from the group consisting of oxygen and peroxy compounds which comprises reacting the said polymer in solution in carbon tetrachloride with sulfuryl chloride in the presence of benzoyl peroxide and at a temperature between 50 and 130° C.

AMBROSE McALEVY.